United States Patent [19]
Janky et al.

[11] Patent Number: 5,568,152
[45] Date of Patent: Oct. 22, 1996

[54] INTEGRATED IMAGE TRANSFER FOR REMOTE TARGET LOCATION

[75] Inventors: James M. Janky, Los Altos; Peter V. W. Loomis, Sunnyvale; John F. Schipper, Palo Alto, all of Calif.

[73] Assignee: Trimble Navigation Limited, Sunnyvale, Calif.

[21] Appl. No.: 191,815

[22] Filed: Feb. 4, 1994

[51] Int. Cl.$^6$ .................... G01S 5/02; F41G 1/00
[52] U.S. Cl. ........................... 342/357; 89/41.17
[58] Field of Search .................... 342/357, 450, 342/465, 458; 89/41.05, 41.06, 41.07, 41.17

[56] References Cited

U.S. PATENT DOCUMENTS

| | | | |
|---|---|---|---|
| 3,715,953 | 2/1973 | Allan | 89/41.05 |
| 4,741,245 | 5/1988 | Malone | 89/41.03 |
| 4,754,280 | 6/1988 | Brown et al. | 342/357 |
| 4,949,089 | 8/1990 | Ruszkowsi, Jr. | 342/52 |

OTHER PUBLICATIONS

Ferguson et al, "Three Dimensional Attitude Determination With The Ashtech 3DF 24-Channel GPS Measurement System".
Rath et al, "Attitude Estimation Using GPS", Ion Nat.'l Tech Mtg. San Moko Jan. 1989.
Burgett et al, "The Development and Applications of GPS Determined Attitude" Paper for National Telesystems Conference (NTC 1983).

Primary Examiner—Gregory C. Issing
Attorney, Agent, or Firm—John Schipper

[57] ABSTRACT

Apparatus and method for accurately determining the location of an target or other designated object by an observer that is spaced apart from the object. The observer views the target through a viewer and rangefinder and determines the distance of the target from the observer. The observer determines its own location coordinates, and the angular orientation of the rangefinder relative to a selected line or plane, using Satellite Positioning System (SATPS) signals (such as GPS or GLONASS signals) received by three SATPS antennas and processed by a common SATPS receiver/processor. The SATPS receiver/processor then determines the displacement or offset coordinates of the target relative to the observer and displays the target coordinates on the target image seen in the viewer. The target location coordinates and/or the visual image of the target seen in the viewfinder are transmitted to a control station for subsequent use. A fourth SATPS antenna, with antenna location coordinates that are determined by the location coordinates of the other three SATPS antennas, is provided for antenna backup and/or for checking the accuracy of the SATPS-determined locations of the other three SATPS antennas. Differential SATPS techniques can be used to enhance the accuracy of the SATPS antenna locations. In one embodiment, the rangefinder can be deleted.

3 Claims, 2 Drawing Sheets

INTEGRATED IMAGE TRANSFER FOR REMOTE TARGET LOCATION

FIELD OF THE INVENTION

This invention relates to use of location determination signals from a Satellite Positioning System for determining the location of a remote object that is located in a hostile environment.

BACKGROUND OF THE INVENTION

The scope and nature of hostile military activities, such as battles, firefights and pre-battle reconnaissance, have changed markedly with the introduction of portable, heavy duty weapons and special armor and increased incidences of urban warfare. The typical mobile warrior now is heavily armed, is still quite mobile, and is less vulnerable to small arms tire. The armored tank personnel carrier or tank is heavily protected and must receive a near direct hit to be seriously disabled. This requires fire control that receives very accurate location coordinates for its targets. For battles fought on an open field, and for firefights in an urban warfare situation, this requires determination of the target coordinates by an observer, using equipment that is portable and that provides readings accurate to within a few meters.

In another class of hostile environments, the location of a fire or of a toxic chemical spill that cannot be approached within a reasonable distance is sought, with an associated inaccuracy of less than a few meters.

Several location determination systems are available for such measurements, based on signals received from satellite sources or from ground-based sources. However, many of these systems have associated inaccuracies that are much larger than a few meters. Two location determination systems that may provide the needed location accuracies are the Global Positioning System (GPS) and the Global Orbiting Navigational Statellite System (GLONASS). In particular, GPS techniques have recently been applied in mapping and survey activities where location coordinates are sought.

Deem et al. in U.S. Pat. No. 4,384,293, disclose use of two or more GPS signal antennas, arranged in a line, to obtain information on the angular orientation of that line in a given plane. The radiating elements of adjacent antennas on the line are spaced apart by a fixed multiple of the GPS signal wavelength used.

U.S. Pat. No. 4,807,131, issued to Clegg, discloses an automated land grading system in which the position of a cutting blade is controlled automatically to provide controlled shaping of a land region being graded. A laser beam is projected in a predetermined pattern across the land region, and a laser detector carried on the grading machine receives the beam and approximately determines the location of the cutting blade and the blade angle and depth appropriate for grading that location in the land region. Information on the desired blade angle and depth is stored a microprocessor carried on the grading machine and is compared with the actual blade angle and depth to correct the blade orientation and elevation.

Paramythioti et al, in U.S. Pat. No. 4,873,449, disclose method and apparatus for three-dimensional surveying, using triangulation and a laser beam that propagate along the perimeter of a triangle. A rotatable mirror, a component of the scene to be surveyed, and a light-sensing means are located at the three vertices of the triangle, and knowledge of the angles of orientation of the rotatable mirror and the camera allow determination of the location of the component of the scene presently being surveyed. Three fixed, spaced apart stations, including one station at the scene to be surveyed, and receipt of a line-of-slight light beam are required here.

Apparatus for determining compass headings, using two GPS antennas located at fixed positions aboard a ship or aircraft, is disclosed in U.S. Pat. No. No. 4,881,080, issued to Jablonski. The absolute positions of the GPS antennas must be determined with the usual inaccuracies. A GPS receiver/processor receives the signals sensed by the GPS antennas and determines a compass heading of the ship or aircraft, based upon the known relative positions of the two antennas on the ship or aircraft. A similar configuration, applied to mapping of ocean currents from an aircraft, is disclosed by Young in U.S. Pat. No. 4,990,922.

Gaer, in U.S. Pat. No. 4,924,448, discloses survey apparatus and method for mapping a portion of an ocean bottom. Two ships, each equipped with identical GPS signal antennas, receivers and processors, move along two parallel routes a fixed distance apart on the surface of an ocean. Each ship takes radio soundings of a small region of the ocean bottom directly beneath itself and receives a reflected radio sound from that same region that is originally transmitted by the other ship. The depths of the region directly beneath each ship, as determined by each of the two radio sound waveforms and by the GPS-determined locations of the two ships, are determined and compared for purposes of calibration. A related invention is disclosed by Gaer in U.S. Pat. No. 5,231,609.

A mobile target indicator system, for use in a battlefield, is disclosed by Ruszkowski in U.S. Pat. No. 4,949,089. The target locator system includes GPS antenna and receiver/processor, a radio transmitter, a laser rangefinder, azimuth angle sensor and elevation sensor. A rifleman carries the system into the battlefield and directs the laser rangefinder at a target. The radio transmitter transmits the rifleman's GPS-determined location and the offset location of the target relative to the rifleman to another entity, such as a weapons delivery system to be used against the target. However, in a cluttered battlefield, the operator of the weapons delivery system, and even the rifleman, cannot be certain that the correct target is being sighted.

In U.S. Pat. No. 4,954,833, issued to Evans et al, a method is disclosed for determining the location of a selected and fixed target or site, using a combination of GPS signals and the local direction of gravitational force. Geodetic azimuth is determined using GPS signals, and the local gravitational force vector is used to relate this location to an astronomy azimuth, using a fixed coordinate system that is independent of the local coordinate system. The target and a reference site are each provided with a GPS signal antenna, receiver and processor to determine the local geodetic azimuth.

Evans, in U.S. Pat. No. 5,030,957, discloses a method for simultaneously measuring orthometric and geometric heights of a site on the Earth's surface. Two or more leveling rods held at fixed, spaced apart locations, with a known baseline vector between the rods. Each rod holds a GPS signal antenna, receiver and processor that determines a GPS location for each rod. The geometric height of the GPS antenna (or of the intersection of the rod with the Earth's surface) is determined for each rod, and the geometric height difference is determined, using standard GPS measurements (accurate to within a few meters). The orthometric height difference for each GPS antenna is determined using the measured GPS location of each rod and an ellipsoid or geoid that approximates the local shape of the Earth's surface.

Use of three or more GPS antennas, arranged in a collinear or non-collinear array on a body, to determine the attitude or angular position of the body, is disclosed by Hwang in U.S. Pat. No. 5,021,792 and by Timothy in U.S. Pat. No. 5,101,356. The antennas in the Hwang patent can be rearranged into collinear or non-collinear patterns, and GPS signal measurements are taken before and after rearrangement to determine the angles describing arrival of the GPS signals. In the Timothy patent, three antennas are spaced apart at calibrated distances in a selected pattern, possibly collinearly. The phase differences of each GPS signal arriving at a pair of these antennas are used to determine the angle of arrival of that GPS signal. A similar system, using two spaced apart GPS signal antennas, is disclosed in U.S. Pat. No. 5,119,103, issued to Evans et al.

A surveying instrument that uses GPS measurements for determining location of a terrestrial site that is not necessarily within a line-of-sight of the surveyor is disclosed in U.S. Pat. No. 5,077,557 issued to Ingensand. The instrument uses a GPS signal antenna, receiver and processor, combined with a conventional electro-optical or ultrasonic range finder and a local magnetic field vector sensor, at the surveyor's location. The range finder is used to determine the distance to a selected mark that is provided with a signal reflector to return a signal issued by the range finder to the range finder. The magnetic field vector sensor is apparently used to help determine the surveyor's location and to determine the angle of inclination from the surveyor's location to the selected mark. A second patent issued to Ingensand, U.S. Pat. No. 5,233,357, discloses a "total" surveying station that uses a GPS reference receiver, electrooptical measuring equipment, and a electromagnetic signal roving receiver to determine the roving receiver location and separation vector joining the reference and roving receivers.

In U.S. Pat. No. 5,146,231, Ghaem et al disclose an electronic direction finder that avoids reliance on sensing of terrestrial magnetic fields. The apparatus uses a directional antenna and receiver/processor, for GPS or similar navigation signals received from a GPS satellite, and requires (stored) knowledge of the present location of at least one reference GPS satellite from which signals are received. The orientation of the finder or its housing relative to a line of sight vector from the finder to this reference satellite is determined. This orientation is visually displayed as a projection on a horizontal plane. Any other direction in this horizontal plane can then be determined with reference to this projection from a knowledge of the reference satellite location.

A multiple GPS antenna system for antenna pointing or three-dimensional attitude measurement is disclosed by Ward et al in U.S. Pat. No. 5,185,610. At least two spaced apart antennas are used for pointing, and at least three spaced apart, non-collinear antennas are used, with the distances of separation being much less than the correlation distance for the GPS signals used (29.3 meters and 293 meters for P-code and C/A-code, respectively). Inclusion of more than the minimum number of GPS antennas needed for the application allows optimization of the overdetermined GPS solutions. In-phase and quadrature signals are generated and analyzed by the system.

U.S. Pat. No. 5,193,064, issued to Maki, discloses a system for integrating GPS signals and inertial navigation system (INS) signals, without using accelerometers, to provide velocity steering and location information for an airborne vessel. Gyro readout signals provide information on the present direction of motion of the vessel.

Shaw et al disclose a system for measuring angles-of-arrival of radiowaves at a high performance, high maneuverability aircraft, using Doppler shifts of the waves and location and velocity vectors determined by an on-board GPS or INS, in U.S. Pat. No. 5,241,313. The aircraft velocity vector is changed in a preselected, segmented manner, and the corresponding Doppler shifts for each segment am analyzed to determine the propagation direction of the wavefronts.

Some workers have reconfigured camera viewfinders or similar apparati to attempt to measure distance of an object shown in the viewfinder. In U.S. Pat. No. 3,486,432, Norwood discloses a viewfinder for a conventional camera in which the present lens focal length used and the distance to a designated object are displayed along first and second orthogonal coordinate axes immediately adjacent to the standard viewfinder. The lens used here is an electronically operated zoom lens. Two levers adjust the focal length and focus distance of the zoom lens and, simultaneously, provide the focal length and distance parameter values displayed on the first and second coordinate axes. These parameter values are sensed and adjusted by portions of the light beam that forms an image for the film in the conventional camera.

Grassl discloses a single lens reflex camera having an optoelectronic distance meter mounted adjacent to the camera viewfinder. Two small portions of the image-forming light beam are split off and used to determine the distance to a designated object in the field of view of the camera lens. These small light beam portions are sensed by two light beam sensors that determine the lens-object distance by correlation of certain displaced images.

Corby, in U.S. Pat. No. 4,687,326, discloses a camera that integrates sensing of distance to each of a designated sequence of objects in the camera field of view and general luminance of the scene in the field of view. The designated objects are determined by a linear array decomposition (N×1) of a portion of the field of view, where the N objects in the linear array are interrogated by a time-and-space-coded sequence of light rays that scan across this linear array in the field of view. Sensing of the general luminance of the scene occurs during an (N+1)th member of this sequence in time so that a total of N+1 temporal slots are used to provide N lens-to-object distances and general luminance for the image in the field of view.

Neely discloses apparatus for sensing and displaying the distance from camera lens to designated object in the field of view in alphanumeric form in U.S. Pat. No. 4,754,296. Lens-to-object distance is sensed by a sonar echo technique that resembles radar. This apparatus also displays general scene brightness for the field of view. Lens-to-object distance and scene brightness are displayed alphanumerically in the viewfinder of the camera, which is preferably a single lens reflex.

Ozeki et al, in U.S. Pat. No. 4,961,155, disclose an XYZ coordinates measuring system that uses a television cronera with a slit light beam to generate signals, that determine a vector distance ($\Delta x$, $\Delta y$, $\Delta z$) from the lens to a a point on a work surface in the field of view.

A system mounted in a helmet for location determination is disclosed by Mocker et al in U.S. Pat. No. 5,208,641. The helmet includes light retroreflectors, such as cube corners or grooves, that reflect a plurality of beams of laser light directed toward the helmet. The helmet is intended to be used in an aircraft cockpit and typically will not move more than 60 cm in any direction. The time required for return of the light beams is processed to determine the helmet location.

In U.S. Pat. No. 5,216,480, Kaneko et al disclose a surveying instrument for measuring distance to, and azimuth of, a designated object. The instrument directs a light beam along an optical to the object, and the (small) deviation of the object from its customary location is measured using the return light beam. The object must strongly reflect the laser light.

Most of the measurement apparati used in these applications have many major measuring devices and are not portable, and none provides the observer with both an image of the target or other object and the location coordinates for that object. What is needed is a system that (1) provides very accurate location coordinates of the target, (2) provides an image of the target on which the coordinates are superimposed so that the correct target can be identified, (3) uses a small number of different measurement components, (4) provides means for backup in case a component is disabled or unavailable, (5) provides means for optimization of the target location coordinates determined by the system, (6) is portable, and (7) can be used anywhere on the Earth's surface.

SUMMARY OF THE INVENTION

These needs are met by the invention, which provides a relatively simple location and attitude determination means for the observer position and offset measurement means for determination of the displacement coordinates between the observer and the target. The observer apparatus is truly portable and provides signal backup and signal optimization. The invention uses a Satellite Positioning System (SATPS), such as a Global Positioning System (GPS), including two or more SATPS antennas connected to a common SATPS signal receiver/processor, to determine the location of one or more of these antennas and the angular orientation of the antenna mount configuration. A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System and the Global Orbiting Navigational Satellite System.

The SATPS antennas are mounted on a rangefinder/viewer device that is used to sight a target. The location coordinates of the SATPS unit (observer) and of the target relative to the SATPS unit are determined and added together to determine the location coordinates of the target, for fire control and/or target bombardment containment. The system is preferably a differential SATPS that can determine the location of each SATPS antenna with an inaccuracy of a few meters or less.

An inclinometer and/or azimuth angle sensor with electronic readout can serve as backup to determine the observer attitude or orientation, if one or more of the SATPS antennas is disabled or unavailable, but this sensor is not needed if the system operates in a normal manner. Alternatively and preferably, signal backup and signal optimization are provided by inclusion of one or more additional SATPS antennas on the observer apparatus; the inclinometer and azimuth angle sensor are then not needed for signal backup, nor for any other purpose. In one embodiment, at least four SATPS antennas are provided in a plane, with one of these antennas being located at or near the centroid of three other non-collinear antenna locations. This arrangement provides SATPS signal backup, and it provides SATPS signal checking and location optimization if all four antennas are working.

The target location coordinates, or the observer-target displacement coordinates, are displayed on the rangefinder image and thus will change as the rangefinder/viewer is focused on different targets, with the observer location being fixed and known. The displayed target location coordinates, or the rangefinder image and displayed target coordinates, can be electronically transmitted to a central station that controls the bombardment containment devices, or directly to a weapons delivery system.

Where two SATPS antennas are used, the baseline of these antennas may be aligned along the target sighting line, and the rangefinder, but not the image viewer, can be deleted. Where three or more S ATPS antennas are used, these antennas are arranged non-collinearly in a plane that includes or is parallel to a plane that includes the target sighting line. The SATPS antenna mount angular orientation is preferably fixed relative to the angular orientation of the rangefinder/viewer device.

DESCRIPTION OF BEST MODES OF THE INVENTION

Figure 1:
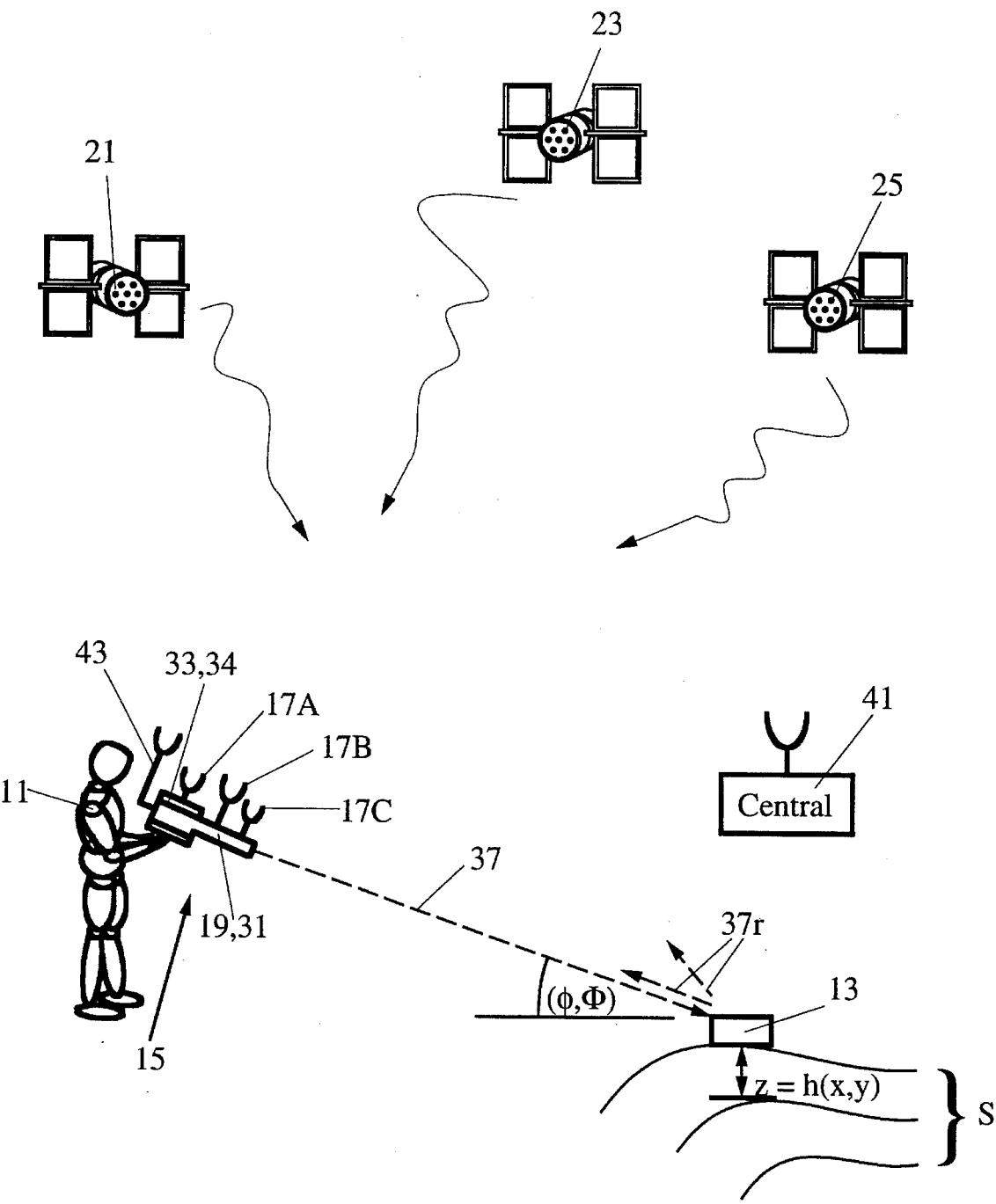
FIG. 1 illustrates use of two embodiments of the invention, using three SATPS signal antennas and a common SATPS receiver/processor.

FIG. 1 illustrates use of one embodiment of the invention, wherein an observer 11 seeks to locate a target or other designated object 13, by determining the location coordinates of the target in a suitable coordinate system, such as (latitude, longitude, elevation) or Earth-fixed, Earth-centered (ECEF) or local Cartesian coordinates. The observer 11 carries a remote location determination (RLD) device 15 that is part of the invention. The RLD device 15 includes three or more SATPS signal antennas 17A, 17B and 17C, arranged non-collinearly in a plane, and an associated receiver/processor 19 that receive SATPS signals from a plurality of three or more SATPS satellites 21, 23 and 25. The SATPS signals received by any one or more of the SATPS antennas 17A, 17B and 17C can be used to determine the location of that antenna, using SATPS signal processing techniques that are well known in this area of art. The RLD device 15 also includes a rangefinder 31 and an image-forming module 33, such as a viewfinder, to determine the distance from an image sensor in the rangefinder to the target 13.

Figure 2:
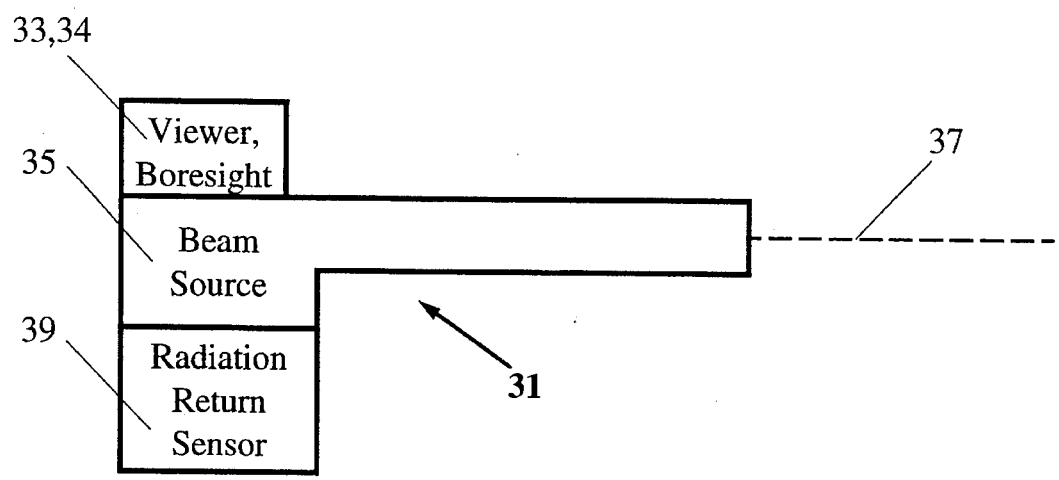
FIG. 2 is a schematic view of a rangefinder used in one embodiment.

The rangefinder 31, shown in greater detail in FIG. 2, includes a laser beam source or a sonic or ultrasonic beam source 35 that directs a thin beam 37 of electromagnetic radiation, having a chosen frequency or range of frequencies, from a boresight 34 in the viewer 33 to the target 13. This radiation is scattered from a small irradiated portion of the target, and a radiation sensor 39, shielded from the source 35 and tuned to that frequency or frequency range, detects a return of scattered energy 37r after a time interval of measured length Δt(return), analogous to return of a radar signal. The distance d from the rangefinder 31 to the target 13 is then estimated to be $$d(\text{target}) \approx c'\Delta t(\text{return})/2, \tag{1}$$

where c' is the velocity of propagation in the troposphere of radiation having the chosen frequency. An example of a suitable rangefinder is disclosed in U.S. Pat. No. 5,208,642, issued to Narutaki for an "Electro-optical Distance Meter." An image-forming module or "viewer" 33 forms and displays a visually perceptible image of the target 13 and its surroundings.

Figure 3:
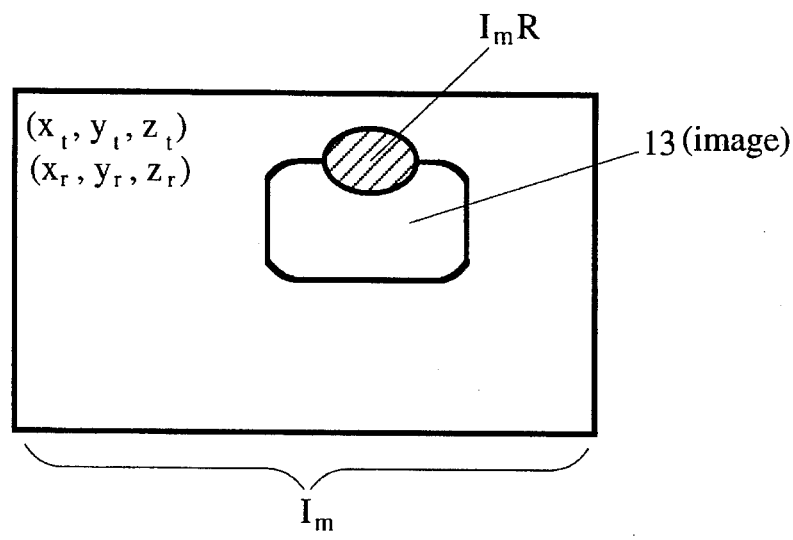
FIG. 3 illustrates an visually perceptible image formed by an image-forming module in one embodiment.

Preferably, the image Im formed by the viewer 33, shown in FIG. 3, includes a small portion ImR that is shown with a distinguishable color or that has some other distinguishing indicium. The portion ImR of the image Im preferably coincides with or is included in the portion of the target 13 that is irradiated by the radiation beam 37. Preferably, the image Im disappears and the viewer 33 becomes opaque for a time interval of selected length Δt(opaque) immediately after the radiation beam 37 is transmitted, to protect the eye(s) of the observer 11 from injury from return of this radiation.

The three SATPS antennas 17A, 17B and 17C in FIG. 1 are arranged non-collinearly in a plane P. The plane P and each of the line segments L(17A,17B), L(17B,17C) and L(17A,17C) (FIG. 4) connecting two antenna locations have fixed and known angular orientations relative to the line of sight of the rangefinder 31. When the location of each of the antennas 17A, 17B and 17C is known, the three-dimensional angular orientation of the beam 37 is known.

The unmodified SATPS-determined locations of the SATPS antennas 17A, 17B and 17C can be used directly to determine the angular orientation of the beam 37 and the location of a point in space that this beam passes through. Alternatively, account may be taken of the fixed distances L(17A,17B), L(17B,17C), and L(17A,17C) extant between the three antenna locations. The SATPS-determined antenna locations can then be varied slightly and optimized to preserve, as nearly as L(17A,17B), L(17B,17C) and L(17A,17C) possible, the rigid distances here in these computations, using a minimum least squares criterion or another suitable quantitative criterion.

If the rangefinder 31 is known in FIG. 1 to be at a location with Cartesian coordinates $(x_r, y_r, z_r)$, if the target 13 is known to lie at a distance d(target) from the rangefinder, and if the rangefinder beam 37 has an angular orientation with azimuthal angle φ and polar angle θ relative to the xy-plane in this coordinate system, the target coordinates $(x_t, y_t, z_t)$ in this system become $$x_t = x_r + d(\text{target}) \sin \phi \sin \theta, \tag{2}$$

$$y_t = y_r + d(\text{target}) \cos \phi \sin \theta, \tag{3}$$

$$z_t = z_r + d(\text{target}) \cos \theta. \tag{4}$$

The target location coordinates in another coordinate system can be expressed using similar expressions. Preferably, the target location coordinates $(x_t, y_t, z_t)$ are superimposed, in a non-intrusive location, on the image Im formed by the viewer 33. The target location coordinates are also transmitted to a control facility 41, using a transmitter and antenna 43 that is connected to the RLD device 15 and to the viewfinder 31. Optionally, the observer 11 can also display the observer's own location coordinates in a suitable local coordinate system, superimposed on the image Im formed by the viewer. Preferably, the observer can toggle between display of the target location coordinates $(x_t, y_t, z_t)$ and display of the observer location coordinates $(x_r, y_r, z_r)$. Optionally, the viewer image Im together with the target coordinates $(x_t, y_t, z_t)$ are transferred to the control facility 41, thus allowing an operator at the control facility to visually perceive the target image that the observer sees, including the small portion ImR of the image that is distinguished in the viewer 33.

If the target 13 is located on a single-valued, two-dimensional surface S, such as the surface of the Earth, that can be locally modeled in a Cartesian coordinate system (x, y, z) by an equation $$z = h(x,y), \tag{5}$$

the rangefinder 31 can be deleted from the system. In this instance, Eqs. (2), (3) and (4) can be combined to produce the linked equations $$(x-x_r)/(\sin \phi)(\sin \theta) = (y-y_r)/(\cos \phi)(\sin \theta) = (z-z_r)/(\cos \theta) = s. \tag{6}$$

Eqs. (5) and (6) can be solved together to determine the distance s from the antenna 17i(i=A, B, C) to the location (x, y, h(x,y)) of the target 13 on the surface S.

Figure 4:
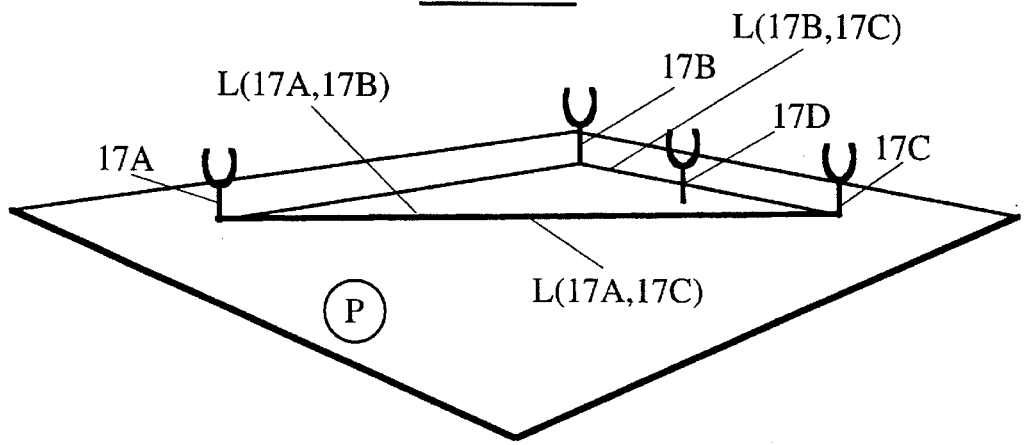
FIG. 4 illustrates a permissible placement of a fourth SATPS antenna for purposes of backup and of quantitative checks on antenna locations.

As another alterative, two SATPS antennas 17A and 17B can be arranged so that the line segment LL (of fixed, known length D) connecting these two antennas is parallel to the line defined by the rangefinder beam 37, as illustrated in FIG. 4. The location coordinates $(x_{17A}, y_{17A}, z_{17A})$ and $(x_{17B}, y_{17B}, z_{17B})$ of these two SATPS antennas can be determined, subject to the constraint $$[(x_{17A}-x_{17B})^2+(y_{17A}-y_{17B})^2+(z_{17A}-z_{17B})^2]^{1/2}=L(17A, 17B) \tag{7}$$

The angular orientation (φ, θ) of the beam line 37 is determined by the relations $$(x_{17A}-x_{17B})/(y_{17A}-y_{17B})=\tan \phi, \tag{8}$$

$$(z_{17A}-z_{17B})/[(x_{17A}-x_{17B})^2+(y_{17A}-y_{17B})^2]^{1/2}=\cot \theta \tag{9}$$

so that only the observer-target distance d and the two sets of location coordinates $(x_{17A}, y_{17A}, z_{17A})$ and $(x_{17B}, y_{17B}, z_{17B})$ need to be determined.

Optionally, a fourth SATPS antenna 17D is positioned at known distances from the other three SATPS antennas 17A, 17B and 17C, and in a non-collinear configuration with any two of these other three antennas, as illustrated in FIG. 4. The antenna 17D provides a backup antenna in the event that one of the other antennas is disabled or unavailable. The SATPS-determined location of the antenna 17D can also be used as a check on the SATPS-determined locations of the three antennas 17A, 17B and 17C. For example, the antenna 17D can be positioned at the centroid of the locations of the three primary antennas 17A, 17B and 17C so that the location coordinates of the antenna 17D is the average of the location coordinates of the other three antennas. More generally, the location coordinates $(x_{17D}, y_{17D}, z_{17D})$ of the antenna 17D can be expressed as weighted sums $$x_{17D}=\Sigma w_i x_{17i}, \tag{10}$$

i=A,B,C $$y_{17D}=\Sigma w_i y_{17i}, \tag{11}$$

$i = A, B, C$ $$z_{17D} = \Sigma w_i z_{17i}, \quad (12)$$

$i = A, B, C$ $$w_A + w_B + w_C = 1 \quad (13)$$

of the location coordinates of the three antennas 17A, 17B and 17C, and the relations (10), (11), (12) and (13) can be used to check the accuracy of the SATPS-determined location coordinates. The known spatial relationships of the four SATPS antenna locations relative to each other can also be used to optimize, through use of least mean squares adjustments or other quantitative adjustments, the SATPS-determined locations of these antennas.

The accuracy of the SATPS-determined locations of the GPS antennas can be enhanced by using differential SATPS (DSATPS) techniques. The control facility 41 or another SATPS station with known location can serve as a reference DSATPS station, and the pseudorange corrections can be transmitted by the reference station to the observer's SATPS receiver/processor for correction of the observer's SATPS-determined location. Alternatively, the observer 11 can transmit its SATPS-determined location or its measured pseudoranges to the reference station for DSATPS processing at the reference station.

This system may be applied to location determination of a remote object or target in a hostile environment. One class of applications is determination of location of the site of an event, such as a fire or a chemical or hazardous substance spill, where an observer cannot initially move to within a reasonable distance of the site without exposing the observer to serious danger. The observer can move to an observation point that permits a full view of the event site, determine the observer's location, determine the event site location relative to the observer's location, and transmit the event site image and/or location coordinates to a control facility for response to, or containment of, the event.

Another class of applications is to determination of the location of a hostile weapon, hostile person (e.g., a sniper), or hostile group that is to be neutralized. The observer needs a line of sight view of the target but need not move to within range of the weapon(s) wielded by the target. Here, the RLD device can be used in urban warfare and in non-urban warfare.

The Global Positioning System (GPS), one form of an SATPS, is part of a satellite-based navigation system developed by the United States Defense Department under its NAVSTAR satellite program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellites move with time relative to the Earth below. Theoretically, three or more GPS satellites will be visible from most points on the Earth's surface, and visual access to two or more satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two spread spectrum, L-band carrier signals: an L1 signal having a frequency $f1 = 1575.42$ MHz and an L2 signal having a frequency $f2 = 1227.6$ MHz. These two frequencies are integral multiples $f1 = 1540\ f0$ and $f2 = 1200\ f0$ of a base frequency $f0 = 1.023$ MHz. The L1 signal from each satellite is binary phase shift key (BPSK) modulated by two pseudo-random noise (PRN) codes in phase quadrature, designated as the P-code and P-code. The L2 signal from each satellite is BPSK modulated by only the C/A-code. The nature of these PRN codes is described below.

One motivation for use of two carrier signals L1 and L2 is to allow partial compensation for propagation delay of such a signal through the ionosphere, which delay varies approximately as the inverse square of signal frequency f (delay$\propto f^{-2}$). This phenomenon is discussed by MacDom in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are generated or stored in GPS satellite signal receivers carried by ground observers. A first PRN code for each GPS satellite, sometimes referred to as a precision code or P-code, is a relatively long, fine-grained code having an associated clock or chip rate of 10 $f0 = 10.23$ MHz. A second PRN code for each GPS satellite, sometimes referred to as a clear/acquisition code or C/A-code, is intended to facilitate rapid satellite signal acquisition and hand-over to the P-code and is a relatively short, coarser-grained code having a clock or chip rate of $f0 = 1.023$ MHz. The C/A-code for any GPS satellite has a length of 1023 chips or time increments before this code repeats. The full P-code has a length of 259 days, with each satellite transmitting a unique portion of the full P-code. The portion of P-code used for a given GPS satellite has a length of precisely one week (7.000 days) before this code portion repeats. Accepted methods for generating the C/A-code and P-code are set forth in the document GPS Interface Control Document ICD-GPS-200, published by Rockwell International Corporation, Satellite Systems Division, Revision A, 26 Sep. 1984, which is incorporated by reference herein.

The GPS satellite bit stream includes navigational information on the ephemeris of the transmitting GPS satellite and an almanac for all GPS satellites, with parameters providing corrections for ionospheric signal propagation delays suitable for single frequency receivers and for an offset time between satellite clock time and true GPS time. The navigational information is transmitted at a rate of 50 Baud. A useful discussion of the GPS and techniques for obtaining position information from the satellite signals is found in Tom Logsdon, *The NAVSTAR Global Positioning System*, Van Nostrand Reinhold, New York, 1992, incorporated by reference herein.

A second configuration for global positioning is the Global Orbiting Navigation Satellite System (GLONASS), placed in orbit by the former Soviet Union add now maintained by the Russian Republic. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have smaller radii, about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carder signals L1 and L2 with frequencies of $f1 = (1.602 + 9\ k/16)$ GHz and $f2 = (1.246 + 7\ k/16)$ GHz, where k ($= 0, 1, 2, \ldots, 23$) is the channel or satellite number. These frequencies lie in two bands at 1.597–1.617 GHz (L1) and 1,240–1,260 GHz (L2). The L1 code is modulated by a C/A-code (chip rate=0.511 MHz) and by a P-code (chip rate=5.11 MHz). The L2 code is presently modulated only by the P-code. The GLONASS satellites also transmit navigational data at at rate of 50 Baud. Because the channel frequencies are distinguishable from each other, the P-code is the same, and the C/A-code is the same, for each satellite. The methods for receiving and analyzing the GLONASS signals are similar to the methods used for the GPS signals.

Reference to a Satellite Positioning System or SATPS herein refers to a Global Positioning System, to a Global Orbiting Navigational Satellite System, and to any other compatible satellite-based system that provides information by which an observer's position and/or the time of observation can be determined, all of which meet the requirements of the present invention.

A Satellite Positioning System (SATPS), such as the Global Positioning System (GPS) or the Global Orbiting Navigation Satellite System (GLONASS), uses transmission of coded radio signals, with the structure described above, from a plurality of Earth-orbiting satellites. A single passive receiver of such signals is capable of determining receiver absolute position in an Earth-centered, Earth-fixed coordinate reference system utilized by the SATPS.

A configuration of two or more receivers can be used to accurately determine the relative positions between the receivers or stations. This method, known as differential positioning, is far more accurate than absolute positioning, provided that the distances between these stations are substantially less than the distances from these stations to the satellites, which is the usual case. Differential positioning can be used for survey or construction work in the field, providing location coordinates and distances that are accurate to within a few centimeters. Differential GPS location determination is discussed by Tom Logsdon in *The NAVSTAR Global Positioning System*, Van Nostrand Reinhold, 1992, pp. 76–90, incorporated by reference herein.

In differential position determination using an SATPS, many of the errors in the SATPS that compromise the accuracy of absolute position determination are similar in magnitude for stations that are physically close. The effect of these errors on the accuracy of differential position determination is therefore substantially reduced by a process of partial error cancellation.

An SATPS antenna receives SATPS signals from a plurality (preferably four or more) of SATPS satellites and passes these signals to an SATPS signal receiver/processor, which (1) identifies the SATPS satellite source for each SATPS signal, (2) determines the time at which each identified SATPS signal arrives at the antenna, and (3) determines the present location of the SATPS antenna from this information and from information on the ephemerides for each identified SATPS satellite. The SATPS signal antenna and signal receiver/processor are part of the user segment of a particular SATPS, the Global Positioning System, as discussed by Tom Logsdon, op cit, pp. 33–90, incorporated by reference herein.

We claim:

1. A handheld system for accurately determining the location of an object by an observer that is spaced apart from the object, the system comprising:

viewer means having a boresight and image viewer, for allowing an observer to view a designated object that is spaced apart from the observer along a line of sight from the observer to the object and for issuing an output image signal containing the visual image of the object sensed by the viewer means;

position determination means, attached to the viewer means, for determining the angular orientation of a selected line in a selected plane containing the position determination means and for determining the location of a selected point in the selected plane, the position determination means comprising:

at least three SATPS signal antennas, numbered 1, 2, 3 and arranged non-collinearly in the selected plane, to each receive SATPS signals from three or more SATPS satellites and to issue these signals as antenna output signals, where antenna i is located at a selected positive distance $L(i,j)$ from antenna j ($i \neq j$; $i,j=1, 2, 3$) and $L(i,j)$ does not exceed one half meter; and an SATPS signal receiver/processor that receives and processes the SATPS signals received by the SATPS antennas, that determines location coordinates of each SATPS antenna, that determines an azimuthal angle $\phi$ and a polar angle $\theta$ of the observer-object line of sight relative to the selected plane and the selected line, that receives the viewer means output image signal, that determines location coordinates of the object, and that issues the object location coordinates as an output location signal;

wherein the object is located on a known, single-valued two-dimensional surface that is approximately represented locally in a Cartesian coordinate system (x, y, z) by a first relation $$z = h(x,y)$$

in the receiver/processor, wherein location coordinates for the observer in this local Cartesian coordinate system are known and are given by $(x_r, y_r, z_r)$, wherein location coordinates $(x_O, y_O, z_O)$ of the object are determined by simultaneously solving this first relation and the three relations given by $$(x_O - x_r)/(\sin \phi)(\sin \theta) = S,$$

$$(y_O - y_r)/(\cos \phi)(\sin \theta) = S,$$

$$(z_O - z_r)/(\cos \theta) = (h(x_O, y_O) - z_r)/(\cos \theta) = S,$$

for the values of the variables $x_O, y_O, z_O$ and s, wherein the quantity s represents a calculated distance between the viewer means and the object; and display means for receiving the output image signal and the output location signal and for displaying a visual image of the object sensed by the viewer means, with at least one of the set of object location coordinates and the set of viewer means location coordinates being superimposed on this visual image.

2. The system of claim 1, further comprising communication means connected to said SATPS receiver/processor for transmitting at least one of said output image signal and said output location signal to a selected receiver that is spaced apart from said viewer means.

3. The system of claim 1, further comprising toggle means, connected to said display means and having first and second positions, for causing said display means to display said set of object location coordinates and to display said set of viewer means location coordinates, superimposed on said visual image, when the toggle means is in the first position and in the second position, respectively.

\* \* \* \* \*